US012577873B2

(12) United States Patent
Yang et al.

(10) Patent No.:    US 12,577,873 B2
(45) Date of Patent:        Mar. 17, 2026

(54) METHODS AND SYSTEMS FOR MINIMIZATION OF DRILLING ENVIRONMENTAL EFFECT ON ACOUSTIC SIGNAL OF DRILL SOUNDS

(71) Applicant: SAUDI ARABIAN OIL COMPANY, Dhahran (SA)

(72) Inventors: Yunlai Yang, Dhahran (SA); Wei Li, Beijing (CN); Maher I. Almarhoon, Al Qatif (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 364 days.

(21) Appl. No.: 18/550,454

(22) PCT Filed: Dec. 13, 2022

(86) PCT No.: PCT/CN2022/138701
§ 371 (c)(1),
(2) Date: Sep. 13, 2023

(87) PCT Pub. No.: WO2024/124401
PCT Pub. Date: Jun. 20, 2024

(65) Prior Publication Data
US 2025/0034994 A1      Jan. 30, 2025

(51) Int. Cl.
*E21B 47/16*         (2006.01)
*G01V 1/32*          (2006.01)
*G01V 1/50*          (2006.01)

(52) U.S. Cl.
CPC ............. *E21B 47/16* (2013.01); *G01V 1/325* (2013.01); *G01V 1/50* (2013.01)

(58) Field of Classification Search
CPC .......... E21B 47/16; G01V 1/325; G01V 1/50; G01V 1/307; G01V 2200/16
See application file for complete search history.

(56) References Cited

U.S. PATENT DOCUMENTS 7,404,456 B2    7/2008  Weaver et al.
9,234,974 B2    1/2016  Yang
         (Continued)

FOREIGN PATENT DOCUMENTS

CN       106256989 A     12/2016
CN       109869142 B     11/2021
         (Continued)

OTHER PUBLICATIONS

International Search Report and Written Opinion of the International Searching Authority issued in corresponding International Application No. PCT/CN2022/138701, mailed Aug. 21, 2023 (8 pages).

*Primary Examiner* — Amine Benlagsir
(74) *Attorney, Agent, or Firm* — Osha Bergman Watanabe & Burton LLP

(57)        ABSTRACT

A well site may include a wellbore extending into a subsurface formation and a drilling rig with a top drive and a drive shaft to rotate a drill string extending into the wellbore. The drill string includes a drill bit at an end distal to the drilling rig to cut rock of the subsurface formation to form the wellbore. Acoustic sensors may be positioned on the drive shaft, or the top drive, or the drill string. The acoustic sensors are configured to record and transmit drilling acoustic signals during a dummy drilling operation and a real drilling operation. A computer system may be in communication with the acoustic sensors. The computer system processes the drilling acoustic signals during the dummy drilling operation and the real drilling operation to minimize a drilling environmental effect by deducting a drilling environmental noise from the drilling acoustic signals to calculate clean drilling acoustic signals.

18 Claims, 8 Drawing Sheets

(56) References Cited

U.S. PATENT DOCUMENTS

| | | | | |
|---|---|---|---|---|
| 9,447,681 | B2 | 9/2016 | Yang | |
| 9,664,012 | B2 * | 5/2017 | Deutch | E21B 43/11 |
| 9,903,974 | B2 | 2/2018 | Yang | |
| 10,551,516 | B2 * | 2/2020 | Yang | G01V 1/168 |
| 11,131,184 | B1 * | 9/2021 | Alali | E21B 47/12 |
| 2006/0098531 | A1 | 5/2006 | Gardner et al. | |
| 2008/0068211 | A1 * | 3/2008 | Aiello | E21B 47/13 |
| | | | | 340/854.6 |
| 2015/0034386 | A1 * | 2/2015 | Reed | E21B 34/10 |
| | | | | 175/48 |
| 2016/0049855 | A1 * | 2/2016 | Davey | H02K 7/11 |
| | | | | 175/170 |
| 2016/0319656 | A1 * | 11/2016 | Downie | G01P 3/48 |
| 2017/0191314 | A1 * | 7/2017 | Faircloth | E21B 37/00 |
| 2019/0028014 | A1 * | 1/2019 | Davey | F03D 9/25 |
| 2019/0072685 | A1 * | 3/2019 | Yang | G01V 1/168 |
| 2019/0345808 | A1 * | 11/2019 | Suryadi | E21B 43/12 |
| 2020/0088904 | A1 * | 3/2020 | Dementyev | E21B 49/00 |
| 2021/0304060 | A1 * | 9/2021 | Al Madani | G01V 20/00 |
| 2021/0389492 | A1 | 12/2021 | Yang et al. | |

FOREIGN PATENT DOCUMENTS

| | | |
|---|---|---|
| CN | 113889061 A | 1/2022 |
| JP | H09-324412 A | 12/1997 |

\* cited by examiner

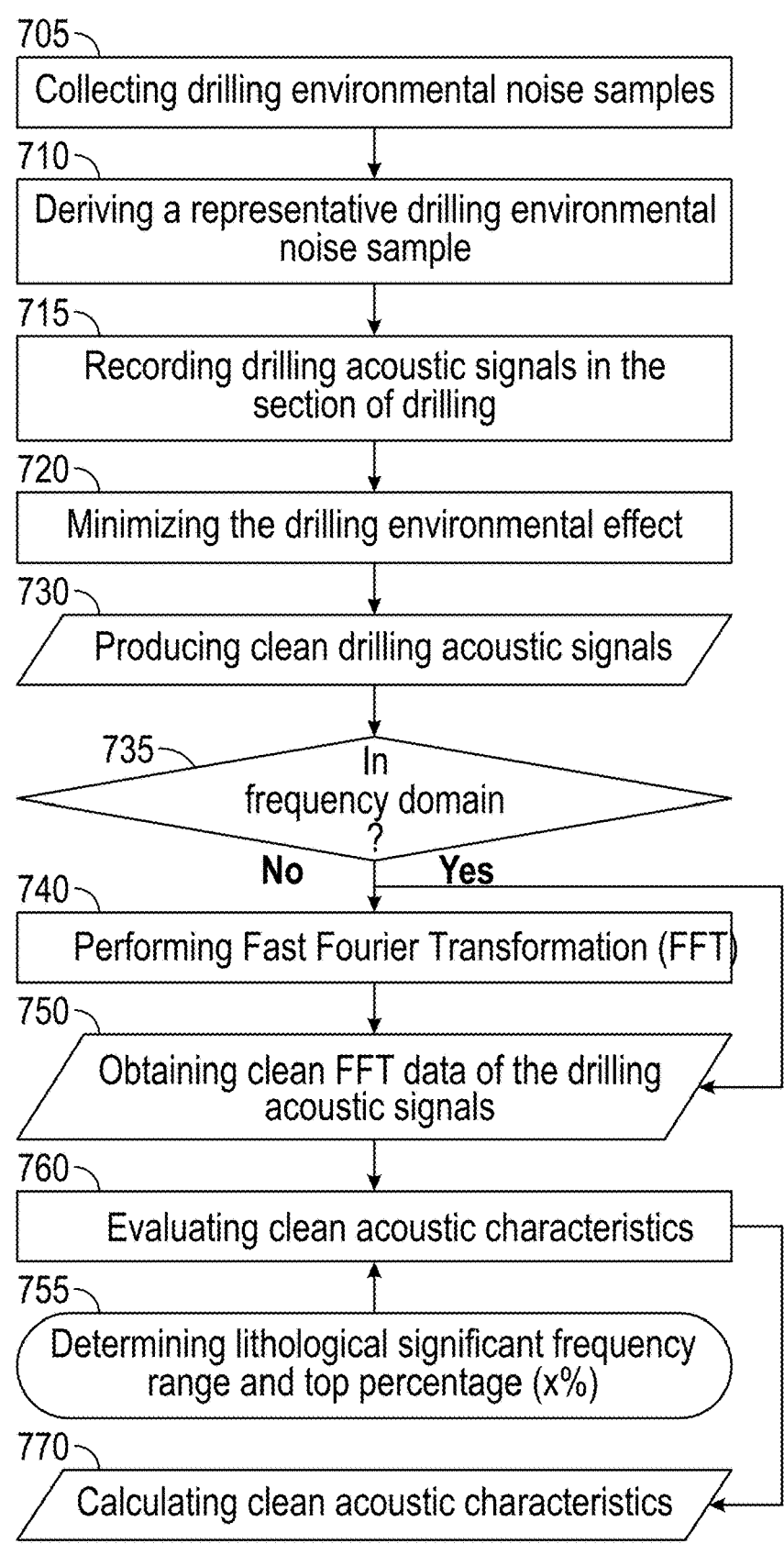

705 — Collecting drilling environmental noise samples

710 — Deriving a representative drilling environmental noise sample

715 — Recording drilling acoustic signals in the section of drilling

720 — Minimizing the drilling environmental effect

730 — Producing clean drilling acoustic signals

735 — In frequency domain ?

No          Yes

740 — Performing Fast Fourier Transformation (FFT)

750 — Obtaining clean FFT data of the drilling acoustic signals

760 — Evaluating clean acoustic characteristics

755 — Determining lithological significant frequency range and top percentage (x%)

770 — Calculating clean acoustic characteristics

FIG. 7

METHODS AND SYSTEMS FOR MINIMIZATION OF DRILLING ENVIRONMENTAL EFFECT ON ACOUSTIC SIGNAL OF DRILL SOUNDS

BACKGROUND

Fluids are typically produced from a reservoir in a formation by drilling a wellbore into the formation, establishing a flow path between the reservoir and the wellbore, and conveying the fluids from the reservoir to the surface through the wellbore. To drill the wellbore, a drill bit attached to a drill string is used to drill through the formation. At the drill bit, rock properties (such as rock type) may be measured during drilling in real time to provide the operator the ability to steer a drill bit in the direction of desired hydrocarbon concentrations. Additionally, measurements at the drill bit may also enable the operator to precisely position casing shoe by knowing rock boundaries. Some types of systems attempt to provide data at the drill bit, in real-time during drilling, by recording and processing drill sounds, resulted from the drill bit engaging rock during drilling operations. For example, the drill sounds may be recorded and processed by using acoustic sensors attached to either drive shaft or its extensions of a drill rig on surface, or a downhole subassembly adjacent to the drill bit of a drill rig.

The drill sounds are dependent on lithology properties, such as lithology type. Because the drill sounds are lithology dependent, the drill sounds may be used in some real time applications, such as deriving lithological information (such as lithology type), geo-steering, rock boundary detection. In some embodiments, a tool records drill sounds by using acoustic sensors attached to either drive shaft extensions of a drill rig on surface, or a downhole subassembly adjacent to the drill bit of a drill rig as described in U.S. Pat. Nos. 9,234,974; 7,404,456; 9,447,681; and 9,903,974. However, during drilling, environmental noises are generated and the drill sounds are also affected by drilling operation factors, such as the drill string rotation rate. Therefore, the drill sounds recorded are not purely resulted from the cutting actions of the drill bit on the rock. The recorded drill sounds contain environmental noise and are also affected by various drilling operation factors. To maximally extracting lithological information from the drill sounds, methods are needed to minimize the environmental noises and drilling operation effect.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, the embodiments disclosed herein relate to a well site. The well site may include a wellbore extending into a subsurface formation and a drilling rig with a top drive and a drive shaft to rotate a drill string extending into the wellbore. The drill string includes a plurality of drill pipes connected end-to-end to form a conduit. The drill string includes a drill bit at an end distal to the drilling rig. The drill bit is configured to cut rock of the subsurface formation to form the wellbore. One or more acoustic sensors may be positioned on the drive shaft, or the top drive, or the drill string. The one or more acoustic sensors is configured to record and transmit drilling acoustic signals during a dummy drilling operation and a real drilling operation. A computer system may be in communication with the one or more acoustic sensors. The computer system processes the drilling acoustic signals during the dummy drilling operation and the real drilling operation to minimize a drilling environmental effect by deducting a drilling environmental noise from the drilling acoustic signals to calculate clean drilling acoustic signals.

In another aspect, the embodiments disclosed herein relate to a method to derive clean drilling acoustic signals for each section of drilling a wellbore. The method may include collecting, with one or more acoustic sensors on drilling equipment, drilling environmental noise samples from a dummy drilling operation; deriving, with a computer system in communication with the one or more acoustic sensors, a representative drilling environmental noise sample from the drilling environmental noises samples; recording, with one or more acoustic sensors, drilling acoustic signals from drilling a section of the wellbore; and producing, with the computer system, clean drilling acoustic signals by deducting the representative drilling environmental noise sample from the drilling acoustic signals.

In yet another aspect, the embodiments disclosed herein relate to a non-transitory computer readable medium storing instructions on a memory coupled to a processor. The instructions may include functionality for: deriving a representative drilling environmental noise sample from a drilling environmental noises samples collected by a one or more acoustic sensors on a drilling rig; and producing clean drilling acoustic signals by deducting the representative drilling environmental noise sample from the drilling acoustic signals.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIG. 7 illustrates a flowchart in accordance with one or more embodiments of the present disclosure.

DETAILED DESCRIPTION

Figure 1:
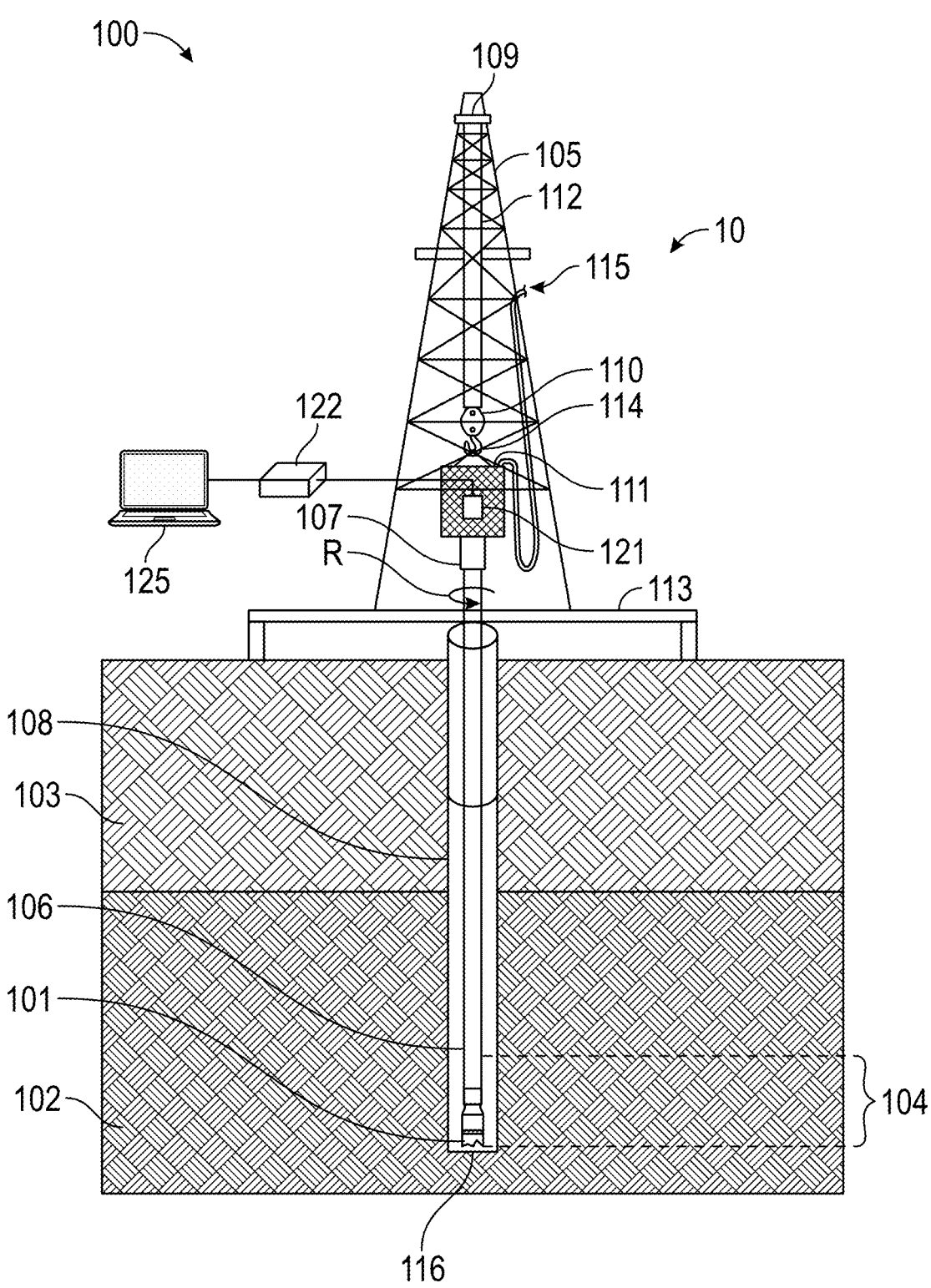
FIG. 1 shows an exemplary well site in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description. Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for minimizing the drilling environmental effect on recorded drill sounds.

Specifically, drill sounds generated only by drilling environmental effect are collected before a drill bit is lowered to a bottom a wellbore. In some embodiments, for example, when a drill string is being lowered, the drill string is stopped when the drill bit is just above the bottom of the wellbore. In addition, a dummy drilling may be conducted by keeping the drill bit at the same depth while maintain the same relevant drilling parameters, such as drill string rotation rate and applied drilling mud pressure, as those will be applied in the drilling of the next section. The dummy drilling is conducted for a short time and the drill sounds are recorded. The drill sounds recorded during the dummy drilling may act as the drilling environmental noise for the next section of drilling. After the drill sounds during the dummy drilling have been recorded, the drill string is lowered until the drill bit touches the bottom of the hole and the real drilling is resumed. The drill sound is then recorded for the next section of drilling. Next, the drilling environmental effect on the recorded drill sound may then be minimized by deducting the drilling environmental noise recorded during dummy drilling from the drill sound recorded during real drilling. Further, some acoustic characteristics, such as apparent power, representing features of the acoustic signals of the drill sound are derived from the cleaned drill sounds. It is further envisioned that for each section of drilling (i.e., when a length of drill pipe is added), the above methods may be conducted to derive clean drill sounds and clean acoustic characteristics for the section. Overall, the clean drill sounds and clean acoustic characteristics are more closely related to lithologies than conventional raw data, and thus, the systems and methods discloses herein will provide an enhanced quality of applications for downhole operations.

FIG. 1 illustrates an exemplary well site 10. In general, well sites may be configured in a myriad of ways. Therefore, well site 10 is not intended to be limiting with respect to the particular configuration of the drilling equipment. The well site 10 is depicted as being on land. In other examples, the well site 10 may be offshore, and drilling may be carried out with or without use of a marine riser.

In one or more embodiments, drilling operations may be conducted at the well site 10 with a drilling rig 100. The drilling operation may include drilling a wellbore 108 into a subsurface including various formations 102, 103. For example, a drill bit 101 of the drilling rig 100 cuts into the formations 102, 103 beneath. The cutting is conducted through a rotation of the drill bit 101. The rotation of the drill bit 101 is provided by a top drive 111. For example, the top drive 111 is coupled to the top of a drill string 106 and is operable to rotate (see arrow R) the drill string 106 via a drive shaft 107. Alternatively, the drill string 106 may be rotated by means of a rotary table (not shown) on a drilling floor 113 of the drilling rig 100.

The drill string 106 may include a plurality of drill pipes connected end-to-end to form conduit and a bottom hole assembly (BHA) 104 disposed at the distal end of the conduit. The rotation of the drill bit 101 can also be provided by a mud motor (not shown) of the BHA 104 fitted between the drill string 106 and the drill bit 101. It is further envisioned that the BHA 104 may also include various directional drilling tools and wellbore expanders (not shown), such as the mud motor and a reamer, to direct the path at which the drill bit 101 cuts into the subsurface rock of the formations 102, 103. The BHA 104 may further include measurement tools (not shown), such as a measurement-while-drilling (MWD) tool and logging-while-drilling (LWD) tool. The measurement tools may include sensors and hardware to measure downhole drilling parameters, and these measurements may be transmitted to the surface using any suitable telemetry system known in the art. The drill string 106 and the BHA 104 may include other drilling tools known in the art but not specifically shown.

The drill string 106 may be suspended in wellbore 108 by a derrick 105 of the drilling rig 100. A crown block 109 may be mounted at the top of the derrick 105, and a traveling block 110 may hang down from the crown block 109 by means of a cable or drilling line 112. One end of the cable 112 may be connected to a drawworks (not shown), which is a reeling device that may be used to adjust the length of the cable 112 so that the traveling block 110 may move up or down the derrick 105. The traveling block 110 may include a hook 114 on which the top drive 111 is supported.

In one or more embodiments, drilling fluid (commonly called mud) may be stored in a mud pit (not shown), and at least one mud pump (not shown) may pump (see 115) the mud from the mud pit into the drill string 106. The mud may flow into the drill string 106 through appropriate flow paths in the top drive 111 (or a rotary swivel if a rotary table is used instead of a top drive to rotate the drill string 106). For example, while cutting rock with the drill bit 101, mud is pumped into the drill string 106. The mud flows down the drill string 106 and exits into the bottom 116 of the wellbore 108 through nozzles in the drill bit 101. The mud in the wellbore 108 then flows back up to the surface in an annular space between the drill string 106 and the wellbore 108 with entrained cuttings. The mud with the cuttings is returned to the mud pit to be circulated back again into the drill string 106. Typically, the cuttings are removed from the mud, and the mud is reconditioned as necessary, before pumping the mud again into the drill string 106.

During drilling operations, as the top drive 111 is lowered and is approaching the drilling floor 113, the drill string 106 must be lengthened by adding a length of drill pipe on top of the drill string 106. This process of lengthening the drill string 106 is called "making a connection". When making a connection, a driller stops the rotation of the drive shaft 107 and picks up the drill string 106 off a bottom 116 of the wellbore 108 to expose a threaded connection below the drive shaft 107. Additionally, the driller turns the mud pumps off to stop flow of drilling fluid (i.e., mud). During making a connection, the drill bit 101 is moved up with the drill string 106. For example, the drill bit 101 moved a distance away from the bottom 116 of the wellbore 108 to be above the bottom 116 of the borehole 108. The drill string 106 is also secured against the drill floor 113. Then, the drill string 106 is disconnected from the drive shaft 107 to temporarily hang the drill string 106 in the wellbore 108. Next, the top drive 111 is lifted, with the traveling block 110, to the top of the derrick 105 to allow a length of drill pipe to be screwed between the drive shaft 107 and the drill string 106. The drill string 106 is then freed from the drill floor 113. The driller then lowers the drill string 106 while starting the mud pumps and rotation to resume drilling when the drill bit 101 touches the bottom 116 of the wellbore 108. The drilling operations are continued until the next connection of a length of drill pipe such that the wellbore 108 is drilled section by section, for adding the length of drill pipe to the drill string 106.

Still referring to FIG. 1, when drilling into different lithologies or the same lithology with different properties (e.g., porosity, presence of hydrocarbons, presence of fractures, etc.) of the formations 102, 103 with the drilling rig 100, drill sounds emanating from the drill bit 101 and contacted rock of the formations 102, 103 are distinctly different. The drill sounds will transmit upward along the drill string 106. In some embodiments, the drill sounds may be picked up by one or more acoustic sensors 121 attached to the drive shaft 107, or an extension of the drive shaft 107, or the top drive 111, or the BHA 104, or the drill string 106, or other components of the drilling rig 100. The drill sounds picked up by the one or more acoustic sensors 121 may be digitized by a data acquisition unit 122. The digitized data may then be transmitted to a computer system 125, as described in FIG. 8, to be recorded and processed. The recorded drill sounds are termed as drilling acoustic signals hereafter.

Figure 2A:
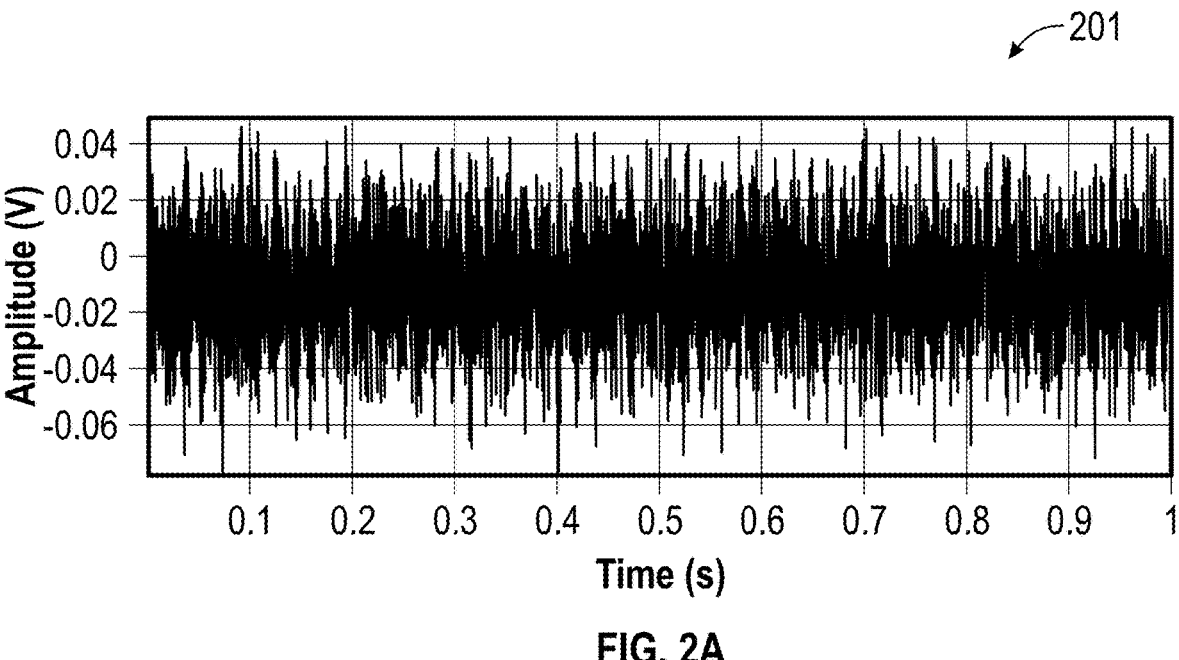
FIG. 2A shows an exemplary graph plotting amplitude over time of drilling acoustic data at a well in accordance with one or more embodiments.
Figure 2B:
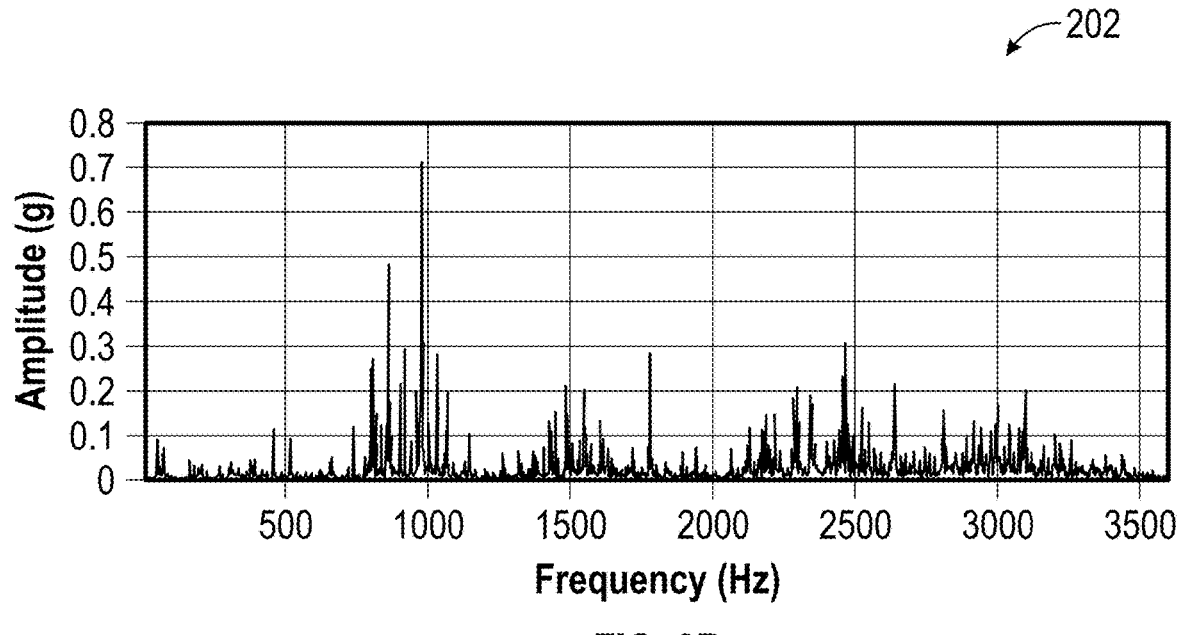
FIG. 2B shows an exemplary graph plotting amplitude over frequency of drilling acoustic data at a well in accordance with one or more embodiments.

In one implementation, the computer system 125 will process the drilling acoustic signals in various graphs, as shown in FIGS. 2A-5. FIG. 2A shows an example of the drilling acoustic signals being a plotted in graph 201. The graph 201 plots an amplitude (volts) of the drilling acoustic signals over time (seconds). From graph 201, the drilling acoustic signals may be transformed by using Fast Fourier Transformation into frequency domain data (FFT data), as shown in graph 202 of FIG. 2B, for analysis. The FFT data of the graph 202 plots the amplitude (g) over frequency (hertz) of a sampled acoustic signal from the drilling acoustic signals. This sampled acoustic signal is termed a "FFT drilling acoustic signal sample" or a FFT sample hereafter.

Figure 3:
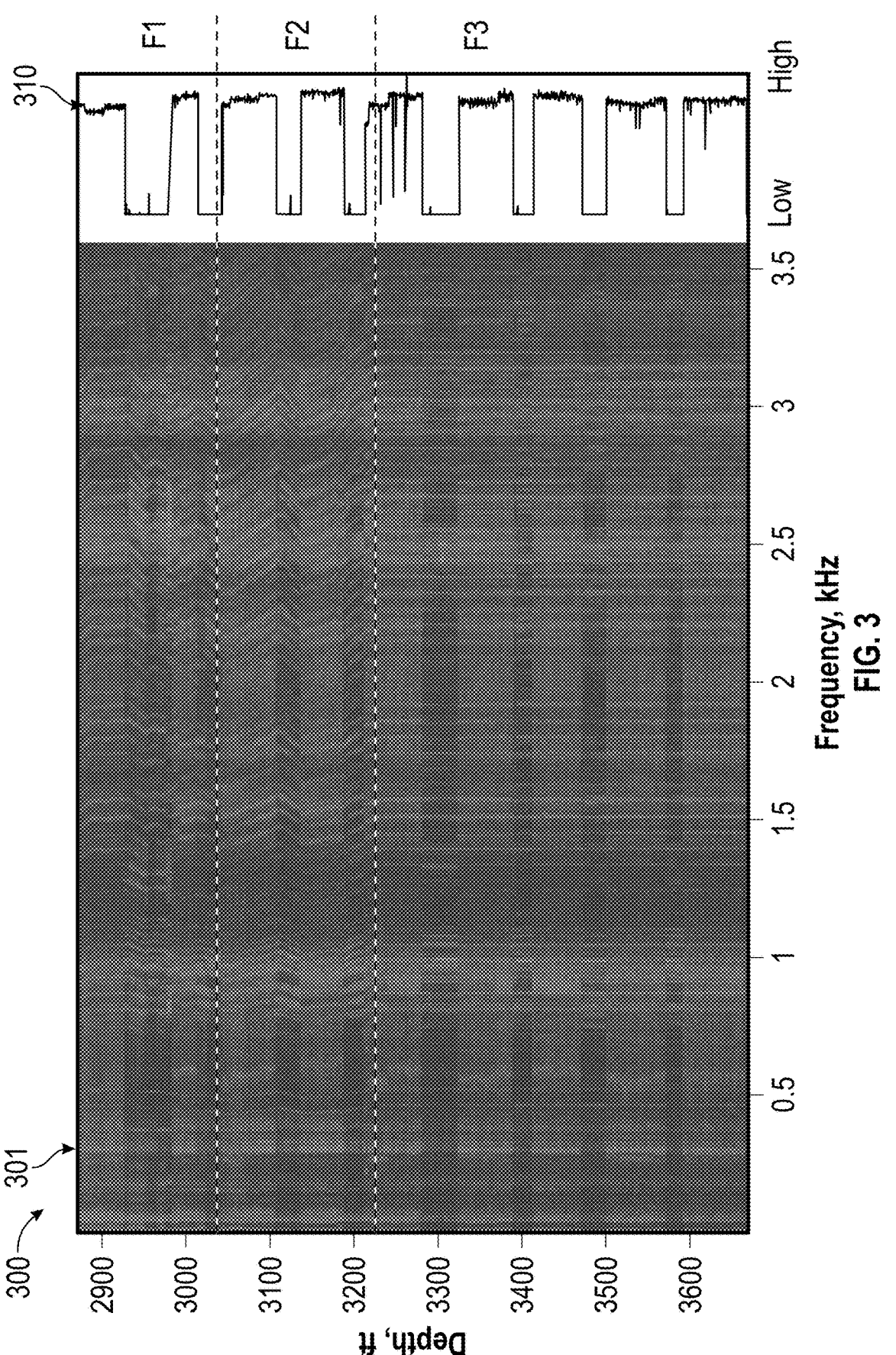
FIG. 3 shows an exemplary graph plotting spectrum of drilling acoustic data along depth at a well in accordance with one or more embodiments.

In some embodiments, the FFT sample of graph 202 may be plotted along a drilling depth during the drilling operations. FIG. 3 shows an example of plotting the FFT samples along depth in a first portion 301 of graph 300. The first portion 301 of the graph 300 represents the spectrum of FFT samples of drilling acoustic signals with a gray scale scheme from a dark color to a light color representing a value from low to high amplitude.

Additionally, a second portion 310 of the graph 300 represents a drill string rotation rate. A value of the drill string rotation rate varies from low to high (from left to right) in the second portion 310. As shown in the graph 300, the drilling acoustic signals (301) are also affected by drilling operation factors, such as the drill string rotation rate. For example, the drilling acoustic signals (301) follows the same strong-weak-strong-weak pattern of the drill string rotation rate (310) along the depth. Typically, this may be caused by the rotation rate of the drill string (106), which rotates drill bit (101) during drilling. As the drill string rotation rate in the second portion 310 is plotted besides the FFT sample in the first portion 301, graph 300 shows that relative low amplitude sections correspond to a low drill string rotation rate, and relative high amplitude sections correspond to a high drill string rotation rate. Therefore, the drilling acoustic signals are not only affected by the properties of the rock under drilling, but also by the drill string rotation rate.

In one or more embodiments, the FFT sample is also recorded in different rock formations (see horizontal lines F1-F3). For example, a first formation F1 may be composed of limestone and clastic sedimentary rocks. A second formation F2 and a third formation F3 may have similar lithology type (i.e., limestone) but with different physical properties, such as porosity and strength. As shown in FIG. 3, in these three rock formations (F1-F3), the drilling acoustic signal data in the FFT sample format are different reflecting an effect of lithology types and properties.

To help to capture lithological properties of the rock under drilling, some characteristics may be derived from the drilling acoustic signals. In some embodiments, for example, an apparent power may be used as a lithology indicating parameter that is expressed using the following equation:

$$P_a = \sum_{i=1}^{n} A_i^2 f_i^2 \qquad \text{Equation 1}$$

where $P_a$ corresponds to an apparent power of a drilling acoustic signal sample (graph 202 in FIG. 2B), the unit of the apparent power depends on a type of acoustic sensor used during the measurement; n corresponds to a number of data points of the drilling acoustic signal sample; $f_i$ corresponds to a frequency of the $i^{th}$ point of the acoustic signal sample in hertz (Hz); and $A_i$ corresponds to an amplitude of the $i^{th}$ point of the acoustic signal sample, the unit of the amplitude depends on a type of acoustic sensor used during the measurement.

Figure 4:
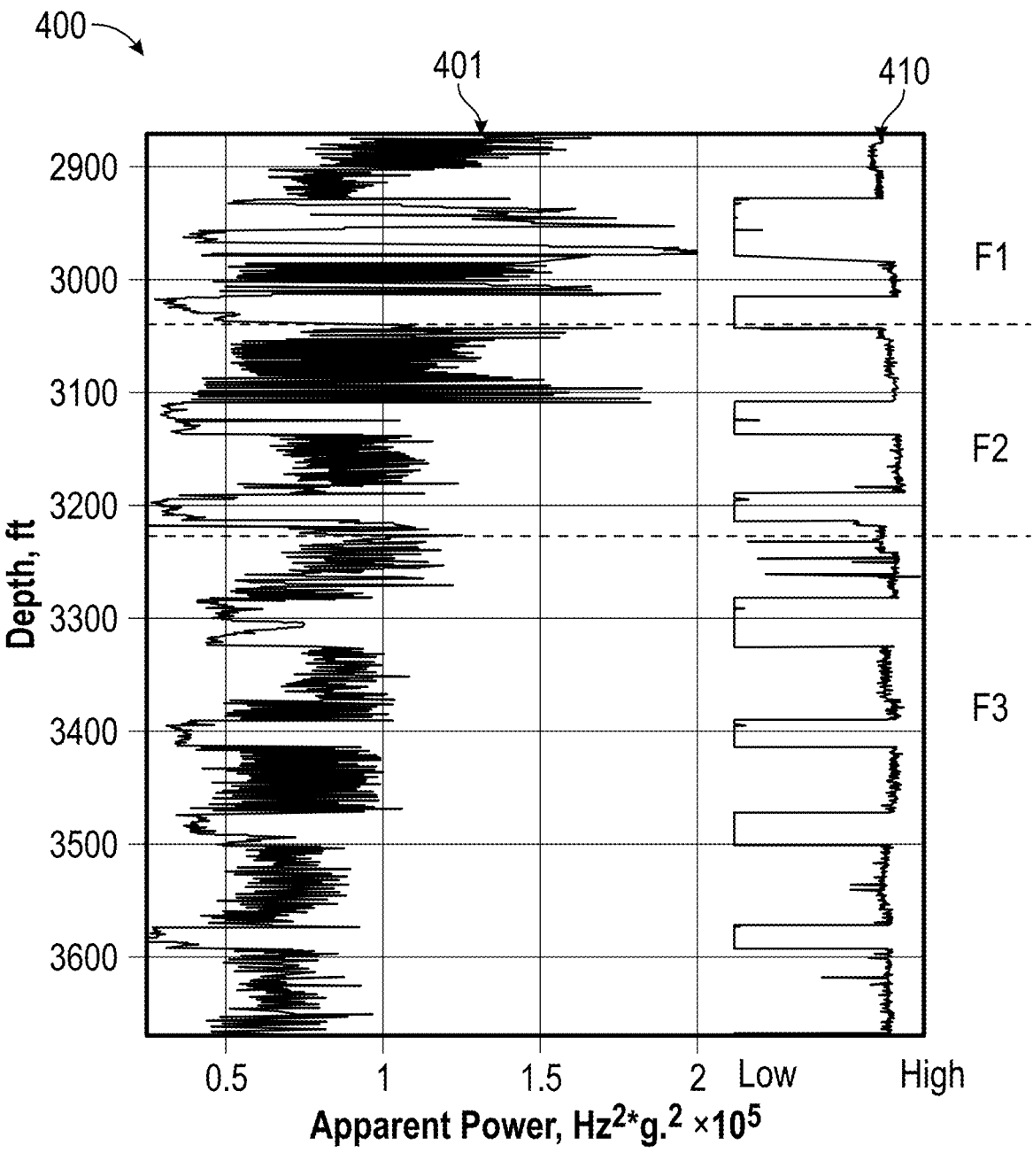
FIG. 4 shows an exemplary graph plotting apparent power of drilling acoustic data along depth at a well in accordance with one or more embodiments.

Now referring to FIG. 4, in one or more embodiments, graph 400 plots the apparent power (see line 401) derived using the Equation 1 from the drilling acoustic signal data (301) from graph 300 in FIG. 3. Additionally, since drilling acoustic signals are affected by the drill string rotation rate, the apparent power may also be affected by the drill string rotation rate. As shown in the graph 400, when comparing the derived apparent power line 401 to a drill string rotation rate line 410, the apparent power is in fact affected by the drill string rotation rate. Specifically, a higher drill string rotation rate results in a higher apparent power. Some other drilling operation factors, such as mud motor rotation rate and drilling mud pressure, may also affect drilling acoustic signals.

To maximally extracting lithological information from drilling acoustic signals, the environmental noises and drilling operation effects on the drilling acoustic signal, the apparent power, and other acoustic characteristics should be minimized. For simplicity purposes only, environmental noises and drilling operation effects are collectively termed as drilling environmental effect, and the drill sounds caused only by the drilling operation effects are termed drilling environmental noise.

Figure 5:
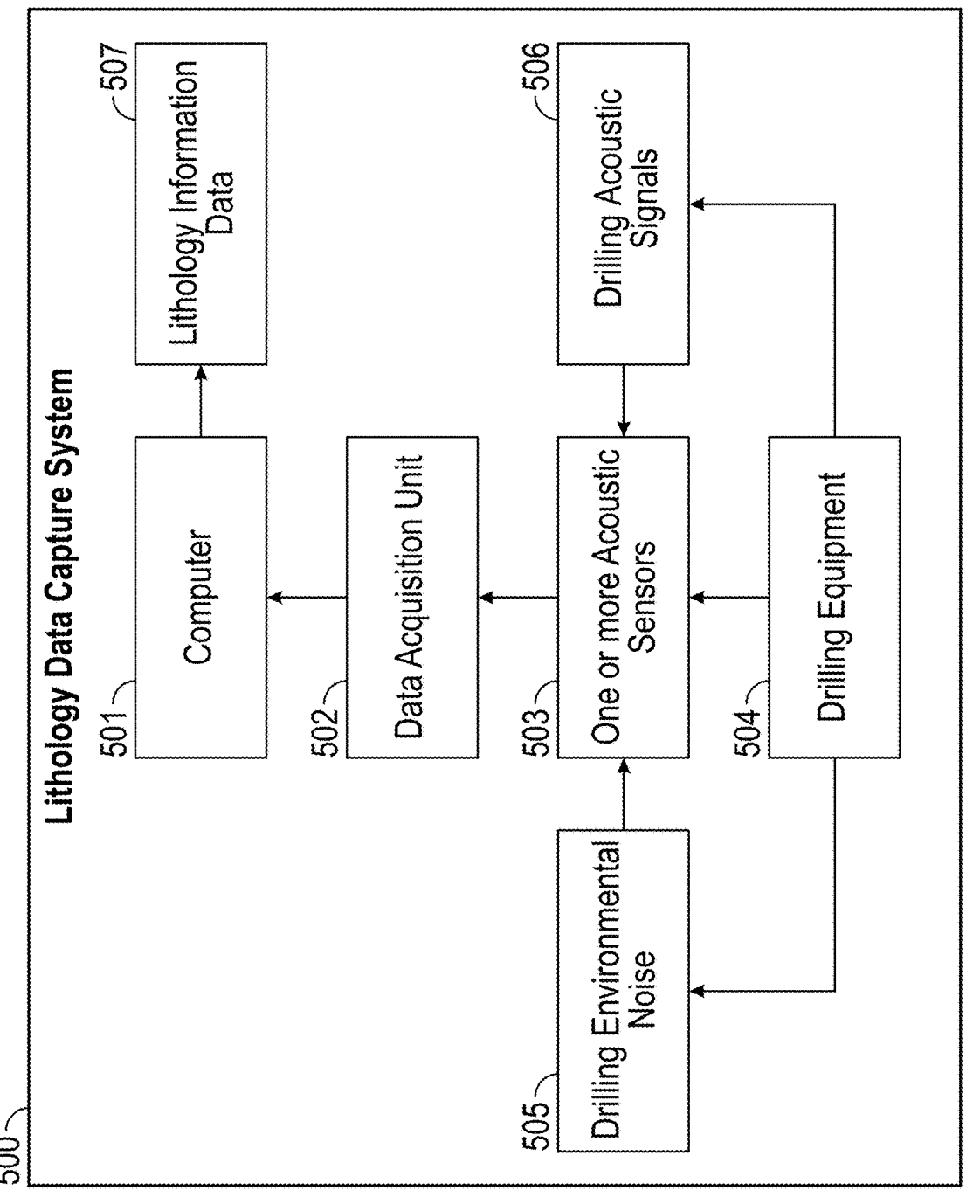
FIG. 5 shows a schematic depiction of a system for minimizing drilling environmental effect in a well in accordance with one or more embodiments of the present disclosure.

Turning to FIG. 5, FIG. 5 shows a block diagram of a lithology data capture system 500 in accordance with one or more embodiments. The lithology data capture system 500 includes a computer 501 coupled to a data acquisition unit 502 digitalizing sounds from one or more acoustic sensors 503 at a well site (i.e., drilling rig). In some embodiments, the data acquisition unit 502 may be integrated within the computer 501. Additionally, the one or more acoustic sensors 503 is positioned on various drilling equipment 504. For example, the one or more acoustic sensors 503 may be attached directly to a drive shaft, or an extension of the drive shaft, or a top drive, or a drill string, or a BHA, or any equipment in communication with a drill bit. The computer 501 uses recorded drill sounds from the one or more acoustic sensors 503 to provide lithology information data 507.

In one or more embodiments, the one or more acoustic sensors 503 collect drilling environmental noise 505 and drill sounds (drilling acoustic signals) 506 via the drilling equipment 504. The drilling environmental noise 505 on the recorded drilling acoustic signals 506 are minimized by the computer 501 deducting the drilling environmental noise 505 from the recorded drilling acoustic signals 506 to generate clean drilling acoustic signals.

The drilling environmental noise 505 generated from just the drilling environmental effect, is collected in a dummy drilling operation. For example, when adding a length of drill pipe to the drill string, the drill string is pulled up to have the drill bit at some distance above the bottom of the wellbore. After making a connection of a length of drill pipe to the drill string, the drill string is lowered until the drill bit is still above the bottom of the wellbore. For example, the drill bit may be 1 foot above the bottom of the wellbore. The dummy drilling operation is then conducted by keeping the drill bit at the same depth (i.e., the same distance above the bottom of the wellbore) and maintaining relevant drilling parameters, such as drill string rotation rate and applied drilling mud pressure the same as in the real drilling of the next section. The relevant drilling parameters may be drilling parameters that will be applied in the drilling operations of the next section of the wellbore (i.e., cutting of the rock to form the wellbore).

In one or more embodiments, the dummy drilling operation is conducted for a short period of time, such as 1 minute, and the drill sounds are recorded. During the dummy drilling operation, as the drill bit is above the rock (i.e., the bottom of the wellbore) the drill bit does not cut the rock such that the recorded drill sounds are purely the drilling environmental noise 505. Additionally, as the relevant drilling parameters being applied during the dummy drilling operation are the same as the drilling parameters that will be applied in actual drilling operations, the drilling environmental noise 505 recorded in the dummy drilling operation correspond to the expected drilling environmental noise in the drilling operations of the next section of the wellbore.

Once the drilling environmental noise 505 is recorded by the one or more acoustic sensors 503, the one or more acoustic sensors 503 transmits the data to the data acquisition unit 502 for digitization and the digitized data is transmitted to the computer 501. Next, the computer 501 processes the digitized data of the drilling environmental noise 505. For example, one representative drilling environmental noise sample may be derived from the recorded drilling environmental noise 505 samples. In some embodiments, the representative drilling environmental noise sample may be derived by averaging the FFT data of the recorded drilling environmental noise 505 samples (as described in FIGS. 2A-3). In the derivation, the amplitude at each frequency of the representative drilling environmental noise sample is the mean of the amplitudes at the same frequency of the recorded drilling environmental noise 505 samples. The result of the derivation produces a representative FFT data sample of the drilling environmental noise 505 samples. It is further envisioned that the derived FFT data sample may be further smoothed. It is further noted that other methods of derivation of a representative acoustic sample from a group of acoustic samples may be used without departing from the scope of present disclosure.

To collect the drill sounds (drilling acoustic signals 506), the drill string is lowered until the drill bit touches the bottom of the wellbore and the real drilling operations are resumed. For example, weight is applied on the drill bit as the drill string is rotated to cut the rock at the bottom of the wellbore thereby extending the depth of the wellbore. As the rock is being cut by the drill bit, the one or more acoustic sensors 503 record the drilling acoustic signals 506 generated from drilling the next section of the wellbore. The same acoustic sensors (503) used to record the drilling environmental noise 505 are used to record the drilling acoustic signals 506. Once the drilling acoustic signals 506 are recorded by the one or more acoustic sensors 503, the one or more acoustic sensors 503 transmits the data to the data acquisition unit 502 for digitization and the digitized data is transmitted to the computer 501. Additionally, the computer 501 processes the digitized data of the drilling acoustic signals.

In one or more embodiments, the computer 501 minimizes the drilling environmental noise on the recorded drilling acoustic signals 506 in the section of drilling by deducting the representative drilling environmental noise sample 505 from the recorded drilling acoustic signals 506. For example, a spectral subtraction method may be used to deduct the representative drilling environmental noise sample from the recorded drilling acoustic signals 506. In the spectral subtraction method, the recorded drilling acoustic signals are firstly transformed to FFT samples with a same frequency distribution as the frequency distribution used to transform the drilling environmental noise 505 into the FFT samples. The representative drilling environmental noise FFT sample is then subtracted from each of FFT samples of the drilling acoustic signals, to derive clean FFT samples of the drilling acoustic signals. In some embodiments, for example, the spectral subtraction method is expressed using the following equation:

$$A_{CS\_i} = A_{S\_i} - A_{N\_i}, \text{ if } A_{S\_i} > A_{N\_i} \qquad \text{Equation 2}$$
$$A_{CS\_i} = 0, \text{ if } A_{S\_i} \leq A_{N\_i}$$

where $A_{CS\_i}$ corresponds to an amplitude of the $i^{th}$ point of the clean FFT sample of the drilling acoustic signals; $A_{S\_i}$ corresponds to an amplitude of the $i^{th}$ point of a FFT sample of the drilling acoustic signals; and $A_{N\_i}$ corresponds to an amplitude of the $i^{th}$ point of the FFT sample of the representative drilling environmental noise sample.

Still referring to FIG. 5, in one or more embodiments, a clean FFT record of the drilling acoustic signals may be further processed by the computer 501 applying Equation 1 to derive an apparent power. For simplicity purposes only, the apparent power derived from a clean FFT record of the drilling acoustic signals is termed clean apparent power. While the drilling environmental noise 505 has been efficiently minimized in the clean drilling acoustic signals, there may still, inevitably, some noises left in the clean drilling acoustic signals. To maximally capture the lithology information data 507, further considerations are taken in the derivation of a clean apparent power, to further eliminate drilling environmental noise 505.

One consideration on the derivation of the clean apparent power may be a frequency range within which the clean apparent power is evaluated. For example, the recorded drilling acoustic signals in some frequency range may be more related to the drilling environmental noise 505. For example, recorded drilling acoustic signals (see 301 in FIG. 3) with a frequency that is greater than 3600 Hz (not shown) are judged as contributed mainly by background noise, since such a frequency does not vary with the rock formations. However, within a predetermined frequency range, the drilling acoustic signals are more closely related with a lithology of the rock. The drilling acoustic signals within the predetermined frequency range may be used in the evaluation for lithology types and properties (i.e., the lithology information data 507). For simplicity purposes only, the predetermined frequency range is termed lithological significant frequency range. A clean apparent power is derived within the lithological significant frequency range.

An additional consideration on the derivation of the clean apparent power is data points from which a clean apparent power is evaluated for a clean FFT sample. In the drilling acoustic signal record, low level background noises always exist. The low-level background noises may not be efficiently removed in the clean drilling acoustic signals. As shown in the first portion 301 in the graph 300 of FIG. 3, the drilling acoustic signal record shows that some data points are distinctive and change regularly along depth. These distinctive data points are considered signals. Between these distinctive signals, there are non-distinctive, smearing data points with low amplitude which are considered background noise. In the present disclosure, data points of a top percentage (x % in terms of amplitude) of a clean FFT sample are considered significant data points and are included in the derivation of a clean apparent power.

In some embodiments, the computer 501 derives a clean apparent power from the significant data points of the clean FFT sample, within the lithological significant frequency range. In one example, the lithological significant frequency range and the significant data points are decided by checking the correlation of the clean apparent power with lithology properties (e.g., lithology type) or with other lithology indication well logs (e.g., gamma ray log) which may be stored in the computer 501. Additionally, the lithology significant frequency range and the top percentage are constants for a given drilling acoustic signal record.

Figure 6:
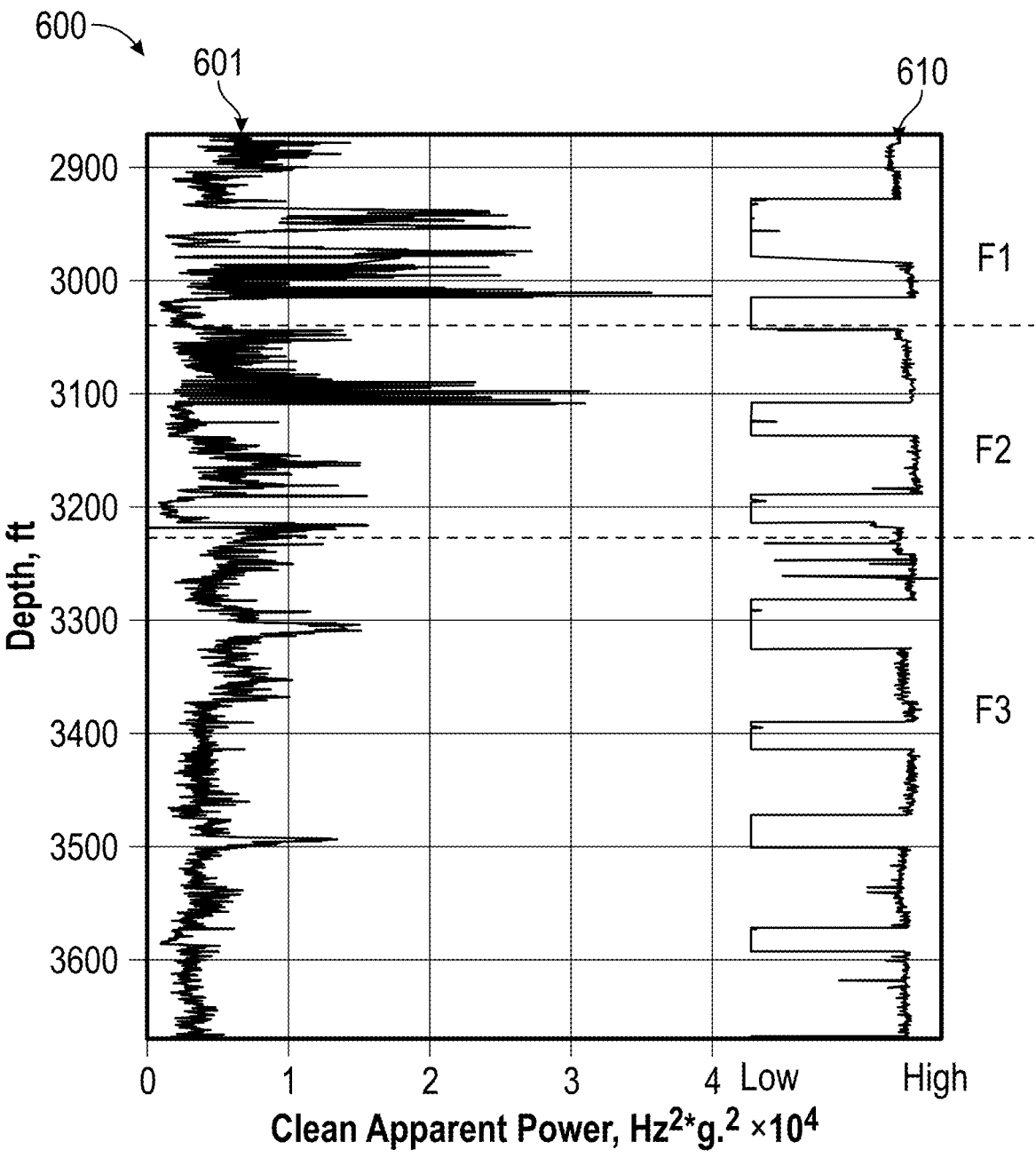
FIG. 6 shows an exemplary graph plotting clean apparent power of drilling acoustic data along depth at a well in accordance with one or more embodiments.

In one or more embodiments, the computer 501 derives the clean apparent power for the drilling acoustic signal record (see 301 in FIG. 3) by applying the above-described method. As shown in FIG. 6, a derived clean apparent power line 601 is plotted in graph 600 with respect to a depth in wellbore. Additionally, a second portion 610 of the graph 600 represents the drill string rotation rate. A value of the drill string rotation rate varies from low to high (from left to right) in the second portion 610.

The effectiveness of the minimization of the drilling environmental effect are apparent when comparing a raw apparent power from the apparent power line (see 401 in FIG. 4) to a clean apparent power from the derived clean apparent power line 601. As shown in FIG. 4, the raw apparent power from the apparent power line 401 changes with the drill string rotation rate (the second portion 410) such that the raw apparent power is significantly affected by drill string rotation rate. In contrast, as shown in FIG. 6, the clean apparent power from the derived clean apparent power line 601 does not change with the drill string rotation rate (the second portion 610). One skilled in the art will appreciate how a comparison between a correlation between the raw apparent power and the drill string rotation rate (shown in graph 400), and a correlation between the clean apparent power and the drill string rotation rate (shown in graph 600) clearly shows that the drill string rotation rate is one of the factors of the drilling environmental effect that has been effectively minimized on the apparent power. Since the drilling environmental effect on the clean apparent power has been effectively minimized, the clean apparent power is much more effective to be used by the computer (501) as a lithology indicator than the raw apparent power.

In addition to the clean apparent power, some other acoustic characteristics, such as mean frequency, deviation of frequency, mean amplitude, and deviation of amplitude may also be evaluated from the significant data points of a clean FFT sample, within the lithological significant frequency range. In some embodiments, for example, acoustic characteristics for an acoustic signal sample in frequency domain are expressed using the following equations:

$$\mu_f = \frac{\sum_{i=1}^{n} A_i \cdot f_i}{\sum_{i=1}^{n} A_i} \qquad \text{Equation 3}$$

$$\sigma_f = \sqrt{\sum_{i=1}^{n} \frac{A_i}{\sum_{i=1}^{n} A_i} (f_i - \mu_f)^2} \qquad \text{Equation 4}$$

$$\mu_A = \frac{1}{n} \sum_{i=1}^{n} A_i \qquad \text{Equation 5}$$

$$\sigma_A = \sqrt{\frac{1}{n} \sum_{i=1}^{n} (A_i - \mu_A)^2} \qquad \text{Equation 6}$$

where $\mu_f$ corresponds to a mean frequency (Hz); $\sigma_f$ corresponds to a deviation of frequency (Hz); $\mu_A$ corresponds to a mean amplitude, the unit of the mean amplitude depends on a type of acoustic sensor used during the measurement; OA corresponds to a deviation of amplitude, the unit of the deviation of amplitude depends on a type of acoustic sensor used during the measurement; $f_i$ corresponds to a frequency of the $i^{th}$ point of the acoustic signal sample (Hz); $A_i$ corresponds to an amplitude of the $i^{th}$ point of the acoustic signal sample, the unit of the amplitude depends on a type of acoustic sensor used during the measurement; and n corresponds to the number of data points of the acoustic signal sample. For simplicity purposes only, the above acoustic characteristics derived in the same way as the clean apparent power are termed clean acoustic characteristics, for example, clean mean frequency.

In one or more embodiments, the clean FFT data and the clean acoustic characteristics may be used by the computer 501 of FIG. 5 in derivation of lithological properties (lithology information data 507), such as lithology type. Additionally, the derivation of lithological properties may be applied in some real time drilling operations, such as geo-steering, lithology boundary detection for casing shoe positioning, and other drilling parameters.

Turning to FIG. 7, FIG. 7 shows a flowchart in accordance with one or more embodiments. Specifically, FIG. 7 describes a general method to derive clean drilling acoustic signals for each section of drilling a wellbore. One or more blocks in FIG. 7 may be performed by one or more components at the well site (10) as described in FIGS. 1-6. While the various blocks in FIG. 7 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In step 705, drilling environmental noise samples are collected with one or more acoustic sensors positioned on various drilling equipment. For example, the one or more acoustic sensors may be attached directly to a drive shaft, or an extension of the drive shaft, or a top drive, or a drill string, or a BHA, or any equipment in communication with a drill bit. To collect the drilling environmental noise samples, a dummy drilling operation is conducted for a short period of time, such as 1 minute. In the dummy drilling operation, when adding a length of drill pipe to the drill string, the drill string is pulled up to have the drill bit in some distance above the bottom of the wellbore. After making a connection of a length of drill pipe to the drill string, the drill string is lowered until the drill bit is still above the bottom of the wellbore. For example, the drill bit may be 1 foot above the bottom of the wellbore. The dummy drilling operation is then conducted by keeping the drill bit at the same depth (i.e., the same distance above the bottom of the wellbore) and maintaining relevant drilling parameters, such as drill string rotation rate and applied drilling mud pressure. The relevant drilling parameters may be drilling parameters that will be applied in the drilling operations of the next section of the wellbore (i.e., cutting of the rock to form the wellbore). During the dummy drilling operation, as the drill bit is above the rock (i.e., the bottom of the wellbore) the drill bit does not cut the rock such that the recorded drill sounds are generated purely by the drilling environmental noise.

In step 710, a representative drilling environmental noise sample is derived from the recorded drilling environmental noise samples. For example, the representative drilling environmental noise sample is derived by averaging the drilling environmental noise samples in a frequency domain.

In step 715, the drilling acoustic signals are recorded in a section of drilling by the one or more acoustic sensors. For example, a drill string is lowered until the drill bit touches a bottom of a wellbore and the real drilling operations are conducted to drill the next section. A weight is applied on the drill bit as the drill string is rotated to cut the rock at the bottom of the wellbore thereby drilling the next section of the wellbore. As the rock is being cut by drill bit, the one or more acoustic sensors record the drilling acoustic signals generated from drilling the next section of the wellbore. The same acoustic sensors used to record the drilling environmental noise are used to record the drilling acoustic signals.

In step 720, the drilling environmental effect on the drilling acoustic signals is minimized. For example, the representative drilling environmental noise sample is deducted from the recorded drilling acoustic signals to minimize the drilling environmental effect. Additionally, the minimization of the drilling environmental effect may be conducted in a time domain or a frequency domain. If conducted in the frequency domain, both the representative drilling environmental noise sample and the drilling acoustic signals are firstly transformed into FFT samples with the same frequency distributions. Then, the drilling environmental noise sample is deducted from the drilling acoustic signals. For example, the deduction of the drilling environmental noise sample is conducted using spectral subtraction methods employing Equation 2.

In step 730, with the drilling environmental effect minimized, a clean drilling acoustic signals is produced.

In step 735, the method determines if the drilling environmental effect was minimized (in the step 720) in frequency domain to produce the clean drilling acoustic signals (in step 730). If the drilling environmental effect was not minimized in the frequency domain (i.e., minimized in the time domain), the produced clean drilling acoustic signals are transformed by applying a Fast Fourier Transformation (FFT), as shown in step 740. However, if the drilling environmental effect was minimized in the frequency domain, the method proceeds to step 750 as FFT was already applied in the minimization of the drilling environmental effect in the frequency domain.

In step 750, a clean FFT data of the drilling acoustic signals is obtained.

In step 755, two parameters of a lithological significant frequency range and a top percentage (x %) are determined. For example, the lithological significant frequency range is a frequency range, within which the drilling acoustic signals are more closely related with lithology of the rock. Additionally, the top percentage (x % in terms of amplitude) represents data points of a clean FFT sample contain less background noise and are considered significant data points In step 760, clean acoustic characteristics are evaluated using the clean FFT data of the drilling acoustic signals, the lithological significant frequency range, and the top percentage (x %). For example, the equations 1 and 3-6 may be applied to calculate the clean acoustic characteristics from the clean FFT data of the drilling acoustic signals within the top percentage (x %) and the lithological significant frequency range.

In step 770, clean acoustic characteristics are obtained.

Based on the calculated clean acoustic characteristics and the clean FFT data of the drilling acoustic signals, real-time operations may be adjusted to improve efficient at well site. For example, during drilling operations, geo-steering may be altered based on the above results as well as a lithology boundary detection for casing shoe positioning. Additionally, the calculated clean acoustic characteristics and the clean FFT data of the drilling acoustic signals may also be used to derive lithological properties, such as lithology type.

Figure 8:
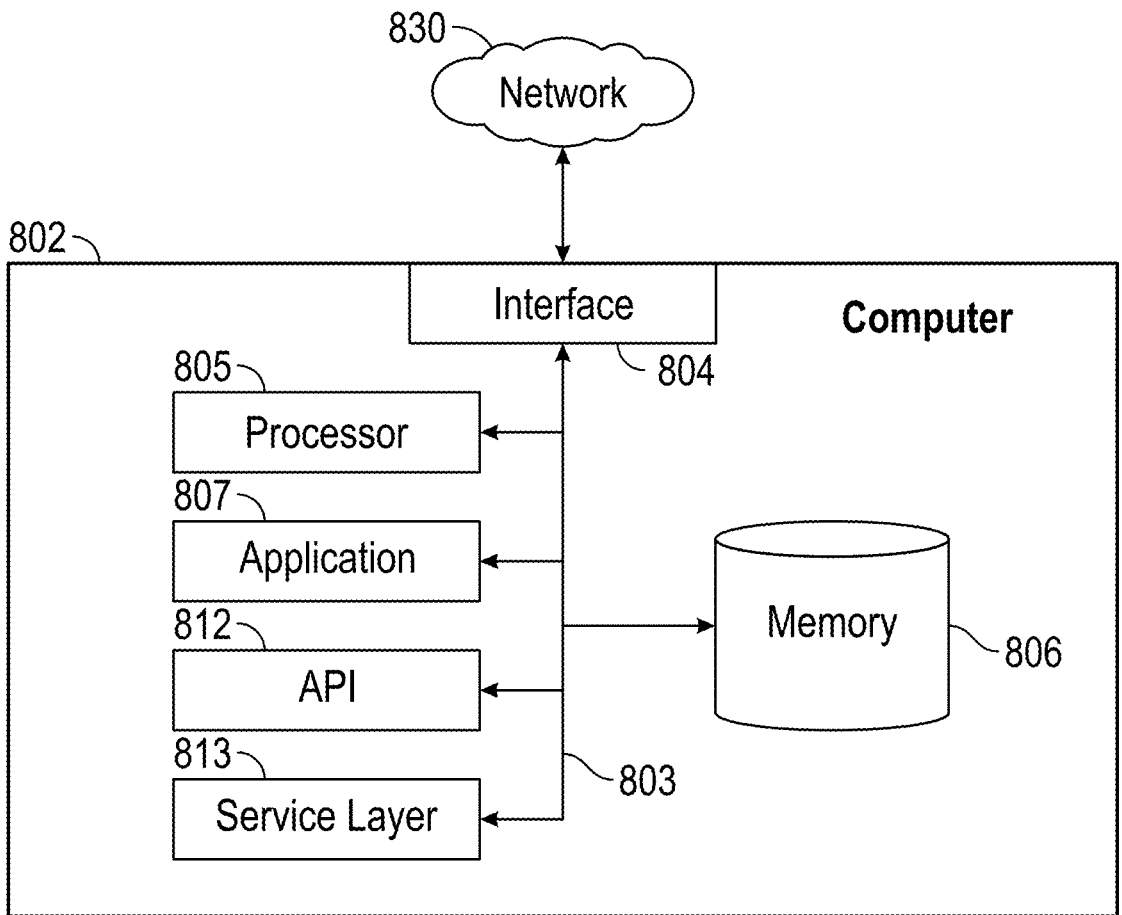
FIG. 8 illustrates a computer system in accordance with one or more embodiments.

Embodiments may be implemented on a computer system such as the computer 125, 501 in FIGS. 1 and 5. FIG. 8 is a block diagram of a computer system 802 used to provide computational functionalities associated with described algorithms, methods, functions, processes, flows, and procedures as described in the instant disclosure, according to an implementation. The illustrated computer 802 is intended to encompass any computing device such as a high-performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 802 may include a computer that includes an input device, such as a keypad, keyboard, touch screen, or other device that can accept user information, and an output device that conveys information associated with the operation of the computer 802, including digital data, visual, or audio information (or a combination of information), or a GUI.

The computer 802 can serve in a role as a client, network component, a server, a database or other persistency, or any other component (or a combination of roles) of a computer system for performing the subject matter described in the instant disclosure. The illustrated computer 802 is communicably coupled with a network 830. In some implementations, one or more components of the computer 802 may be configured to operate within environments, including cloud-computing-based, local, global, or other environment (or a combination of environments).

At a high level, the computer 802 is an electronic computing device operable to receive, transmit, process, store, or manage data and information associated with the described subject matter. According to some implementations, the computer 802 may also include or be communicably coupled with an application server, e-mail server, web server, caching server, streaming data server, business intelligence (BI) server, or other server (or a combination of servers).

The computer 802 can receive requests over network 830 from a client application (for example, executing on another computer 802) and responding to the received requests by processing the said requests in an appropriate software application. In addition, requests may also be sent to the computer 802 from internal users (for example, from a command console or by other appropriate access method), external or third-parties, other automated applications, as well as any other appropriate entities, individuals, systems, or computers.

Each of the components of the computer 802 can communicate using a system bus 803. In some implementations, any or all of the components of the computer 802, both hardware or software (or a combination of hardware and software), may interface with each other or the interface 804 (or a combination of both) over the system bus 803 using an application programming interface (API) 812 or a service layer 813 (or a combination of the API 812 and service layer 813. The API 812 may include specifications for routines, data structures, and object classes. The API 812 may be either computer-language independent or dependent and refer to a complete interface, a single function, or even a set of APIs. The service layer 813 provides software services to the computer 802 or other components (whether or not illustrated) that are communicably coupled to the computer 802. The functionality of the computer 802 may be accessible for all service consumers using this service layer. Software services, such as those provided by the service layer 813, provide reusable, defined business functionalities through a defined interface. For example, the interface may be software written in JAVA, C++, or other suitable language providing data in extensible markup language (XML) format or other suitable format. While illustrated as an integrated component of the computer 802, alternative implementations may illustrate the API 812 or the service layer 813 as stand-alone components in relation to other components of the computer 802 or other components (whether or not illustrated) that are communicably coupled to the computer 802. Moreover, any or all parts of the API 812 or the service layer 813 may be implemented as child or sub-modules of another software module, enterprise application, or hardware module without departing from the scope of this disclosure.

The computer 802 includes an interface 804. Although illustrated as a single interface 804 in FIG. 8, two or more interfaces 804 may be used according to particular needs, desires, or particular implementations of the computer 802. The interface 804 is used by the computer 802 for communicating with other systems in a distributed environment that are connected to the network 830. Generally, the interface 804 includes logic encoded in software or hardware (or a combination of software and hardware) and operable to communicate with the network 830. More specifically, the interface 804 may include software supporting one or more communication protocols associated with communications such that the network 830 or interface's hardware is operable to communicate physical signals within and outside of the illustrated computer 802.

The computer 802 includes at least one computer processor 805. Although illustrated as a single computer processor 805 in FIG. 8, two or more processors may be used according to particular needs, desires, or particular implementations of the computer 802. Generally, the computer processor 805 executes instructions and manipulates data to perform the operations of the computer 802 and any algorithms, methods, functions, processes, flows, and procedures as described in the instant disclosure.

The computer 802 also includes a memory 806 that holds data for the computer 802 or other components (or a combination of both) that can be connected to the network 830. For example, memory 806 can be a database storing data consistent with this disclosure. Although illustrated as a single memory 806 in FIG. 8, two or more memories may be used according to particular needs, desires, or particular implementations of the computer 802 and the described functionality. While memory 806 is illustrated as an integral component of the computer 802, in alternative implementations, memory 806 can be external to the computer 802.

The application 807 is an algorithmic software engine providing functionality according to particular needs, desires, or particular implementations of the computer 802, particularly with respect to functionality described in this disclosure. For example, application 807 can serve as one or more components, modules, applications, etc. Further, although illustrated as a single application 807, the application 807 may be implemented as multiple applications 807 on the computer 802. In addition, although illustrated as integral to the computer 802, in alternative implementations, the application 807 can be external to the computer 802.

There may be any number of computers 802 associated with, or external to, a computer system containing computer 802, each computer 802 communicating over network 830. Further, the term "client," "user," and other appropriate terminology may be used interchangeably as appropriate without departing from the scope of this disclosure. Moreover, this disclosure contemplates that many users may use one computer 802, or that one user may use multiple computers 802.

In some embodiments, the computer 802 is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

In addition to the benefits described above, the systems and methods to derive clean drilling acoustic signals for each section of drilling in a wellbore may improve an overall efficiency and performance at the well site while reducing cost and risk of non-productive time (NPT), and many other advantages. Further, systems and methods for minimization of drilling environmental effect on acoustic signal of drill sounds may provide further advantages such as being able to decrease maintenance and operating cost, improving drilling operations and reaching target depths, determining lithology types, and is not limited to any type of well site (e.g., onshore or offshore).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A well site, comprising:
a wellbore extending into a subsurface formation;
a drilling rig with a top drive and a drive shaft to rotate a drill string extending into the wellbore, the drill string having a plurality of drill pipes connected end-to-end to form a conduit,
the drill string comprises a drill bit at an end distal to the drilling rig, wherein the drill bit is configured to cut rock of the subsurface formation to form the wellbore;
one or more acoustic sensors positioned on the drive shaft, or the top drive, or the drill string, wherein the one or more acoustic sensors is configured to record and transmit drilling acoustic signals during a dummy drilling operation and a real drilling operation; and
a computer system in communication with the one or more acoustic sensors, wherein the computer system processes the drilling acoustic signals during the dummy drilling operation and the real drilling operation to minimize a drilling environmental effect by deducting a drilling environmental noise from the drilling acoustic signals to calculate clean drilling acoustic signal,
wherein in the dummy drilling operation, the drill bit is above a bottom of the wellbore and does not cut the rock, and
wherein in the real drilling operation, the drill bit is in contact with the bottom of the wellbore and does cut the rock, wherein drilling parameters during the dummy drilling operation and the real drilling operation are similar.

2. The well site of claim 1, wherein the drilling parameters during the dummy drilling operation and the real drilling operation comprise at least a drill string rotation rate.

3. The well site of claim 1, wherein the drilling environmental noise is the drilling acoustic signals recorded during the dummy drilling operation.

4. The well site of claim 3, wherein the computer system calculates a lithology properties of the subsurface formation based on clean acoustic characteristics and a clean fast fourier transformation data derived from the clean drilling acoustic signals.

5. The well site of claim 1, wherein the computer system calculates the clean drilling acoustic signals using a spectral subtraction method.

6. A method to derive clean drilling acoustic signals for each section of a plurality of sections of a wellbore, the method comprising:
recording and transmitting, with one or more acoustic sensors, drilling acoustic signals of said each section of the wellbore during a dummy drilling operation and a real drilling operation, wherein a drilling rig with a top drive and a drive shaft to rotate a drill string extending into the wellbore, the drill string having a plurality of drill pipes connected end-to-end to form a conduit, and the drill string comprises a drill bit at an end distal to the drilling rig, wherein the drill bit is configured to cut rock of a subsurface formation to form the wellbore, wherein the one or more acoustic sensors positioned on the drive shaft, or the top drive, or the drill string;
collecting, with the one or more acoustic sensors, drilling environmental noise samples from the dummy drilling operation;
deriving, with a computer system in communication with the one or more acoustic sensors, a representative drilling environmental noise sample from the drilling environmental noise samples;
producing, with the computer system, the clean drilling acoustic signals by deducting the representative drilling environmental noise sample from the drilling acoustic signals to minimize a drilling environmental effect,
wherein in the dummy drilling operation, the drill bit is above a bottom of the wellbore and does not cut the rock, and
wherein in the real drilling operation, the drill bit is in contact with the bottom of the wellbore and does cut the rock, wherein drilling parameters during the dummy drilling operation and the real drilling operation are similar.

7. The method of claim 6, further comprising:
determining, with the computer system, if the drilling environmental effect was minimized in a frequency domain to produce the clean drilling acoustic signals, wherein if the drilling environmental effect was not minimized in the frequency domain, the method further comprising transforming the produced clean drilling acoustic signals by applying a fast fourier transformation.

8. The method of claim 6, further comprising:
transforming, with the computer system, the produced clean drilling acoustic signals into a fast fourier transformation format; and
producing, with the computer system, a clean fast fourier transformation (FFT) data.

9. The method of claim 8, further comprising:
determining, with the computer system, a lithological significant frequency range and a top percentage, wherein the lithological significant frequency range is a frequency range, within which the drilling acoustic signals corresponds with a lithology of the rock being drilled, and wherein the top percentage represents significant data points of the clean FFT data.

10. The method of claim 9, further comprising:

Evaluating, with the computer system, clean acoustic characteristics from the clean FFT data of the drilling acoustic signals, within the lithological significant frequency range, and the top percentage.

11. The method of claim 10, further comprising:

adjusting, in real-time, the dummy drilling and the real drilling operations of said each section of the wellbore.

12. A non-transitory computer readable medium storing instructions on a memory coupled to a processor, the instructions comprising:

recording and transmitting, with one or more acoustic sensors, drilling acoustic signals of each section of a plurality of sections of a wellbore during a dummy drilling operation and a real drilling operation, wherein a drilling rig with a top drive and a drive shaft to rotate a drill string extending into the wellbore, the drill string having a plurality of drill pipes connected end-to-end to form a conduit, and the drill string comprises a drill bit at an end distal to the drilling rig, wherein the drill bit is configured to cut rock of a subsurface formation to form the wellbore, wherein the one or more acoustic sensors positioned on the drive shaft, or the top drive, or the drill string;

collecting, with the one or more acoustic sensors, drilling environmental noise samples from the dummy drilling operation;

deriving a representative drilling environmental noise sample from the drilling environmental noise samples collected by the one or more acoustic sensors on the drilling rig; and producing clean drilling acoustic signals by deducting the representative drilling environmental noise sample from the drilling acoustic signals to minimize a drilling environmental effect, wherein in the dummy drilling operation, the drill bit is above a bottom of the wellbore and does not cut the rock, and wherein in the real drilling operation, the drill bit is in contact with the bottom of the wellbore and does cut the rock, wherein drilling parameters during the dummy drilling operation and the real drilling operation are similar.

13. The non-transitory computer readable medium of claim 12, the instructions further comprising:

determining if the drilling environmental effect was minimized in a frequency domain to produce the clean drilling acoustic signals, wherein if the drilling environmental effect was not minimized in the frequency domain, the instructions comprising functionality for transforming the produced clean drilling acoustic signals by applying a fast fourier transformation.

14. The non-transitory computer readable medium of claim 12, the instructions further comprising:

transforming the produced clean drilling acoustic signals into a fast fourier transformation format; and producing a clean fast fourier transformation data.

15. The non-transitory computer readable medium of claim 12, the instructions further comprising:

determining a lithological significant frequency range and a top percentage, wherein the lithological significant frequency range is a frequency range, within which the drilling acoustic signals corresponds with a lithology of the rock being drilled, and wherein the top percentage represents significant data points of a clean fast fourier transformation (FFT) data.

16. The non-transitory computer readable medium of claim 15, the instructions further comprising:

evaluating clean acoustic characteristics from the clean FFT data of the drilling acoustic signals, within the lithological significant frequency range, and the top percentage.

17. The non-transitory computer readable medium of claim 16, the instructions further comprising:

deriving lithological properties of the rock being drilled from the clean acoustic characteristics; or deriving the lithological properties of the rock being drilled from the clean FFT data of the drilling acoustic signals.

18. The non-transitory computer readable medium of claim 16, the instructions further comprising:

altering a geo-steering of the dummy drilling and the real drilling operations based on the clean acoustic characteristics; or altering the geo-steering of the dummy drilling and the real drilling operations based on derived lithology properties of the rock being drilled.

\* \* \* \* \*